(No Model.)
A. F. HOOD
BICYCLE.
No. 537,462.  Patented Apr. 16, 1895.
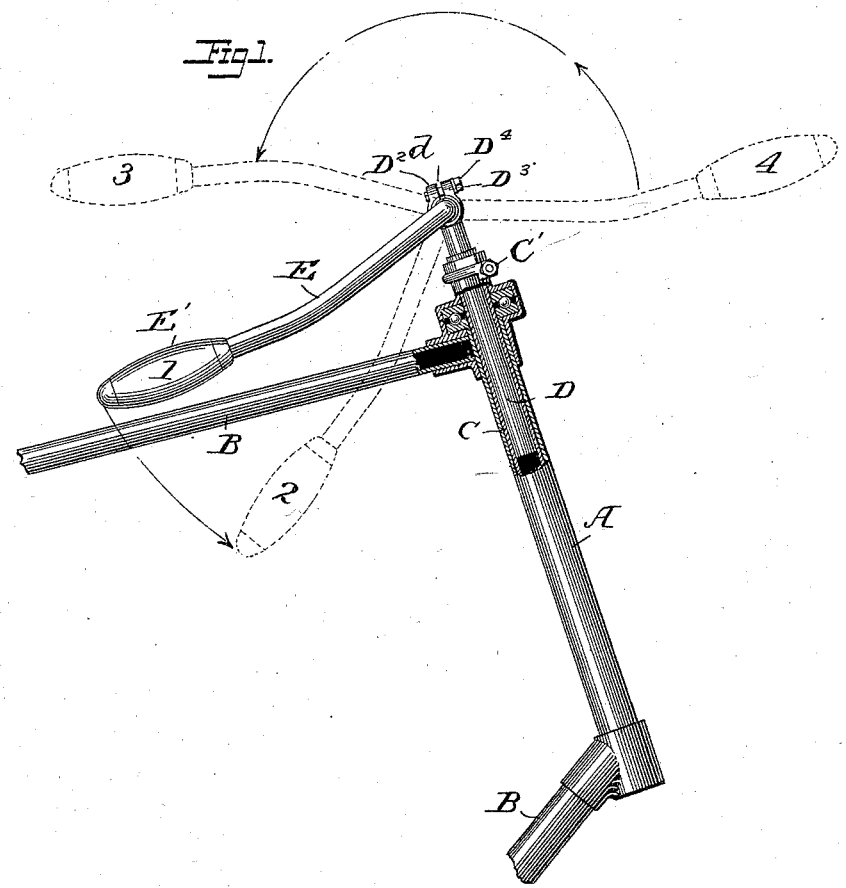
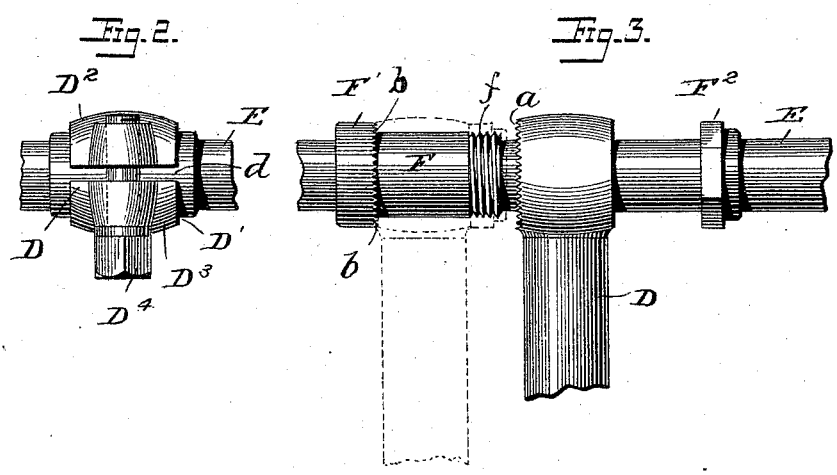
Witnesses  Inventor
Arthur F. Hood
By  Attorneys
THE NORRIS PETERS CO., PHOTO-LITHO., WASHINGTON, D. C.

UNITED STATES PATENT OFFICE.

ARTHUR F. HOOD, OF JAMESTOWN, NEW YORK, ASSIGNOR TO THE FENTON METALLIC MANUFACTURING COMPANY, OF SAME PLACE.

BICYCLE.

SPECIFICATION forming part of Letters Patent No. 537,462, dated April 16, 1895.

Application filed June 23, 1893. Serial No. 478,650. (No model.)

*To all whom it may concern:*

Be it known that I, ARTHUR F. HOOD, a citizen of the United States, residing at Jamestown, in the county of Chautauqua and State of New York, have invented certain new and useful Improvements in Bicycles, of which the following is a specification.

My invention relates to bicycles and more particularly to the handle bars and means for adjusting and attaching said bars, and it has for its object to provide a simple, cheap and effective means whereby the bars may be adjusted and fixed in different relative position, and to these ends my invention consists in the various features of construction and arrangement of parts, substantially as hereinafter set forth.

Referring to the accompanying drawings, wherein I have illustrated one embodiment of my invention, Figure 1 is a side view of as much of a bicycle head and handle as is necessary for a clear understanding of my invention. Fig. 2 is an enlarged detail plan view, showing one means of clamping the handle bar, and Fig. 3, is an enlarged side view of a detail, showing another means of clamping the handle bar.

I have used the term "bicycle" intending to cover thereby any and all kinds of velocipedes and the like, and I have shown my invention applied to a bicycle head of ordinary construction, and it will be evident that it may be applied to various forms and styles of machines by those skilled in the art, without departing from the general principles of the invention. I have also shown various ways of securing the handle bar to the stem of the steering post or yoke, and while the forms shown are well adapted for the purpose described, it is evident that other means may be used for accomplishing this purpose without departing from the principle of my invention.

It is well known that in the use of bicycles, it is often desirable to have the handles adjusted in different positions. Thus when the rider is sitting upright it is desirable to have the handles in a convenient position so that he will be able to maintain the upright position. When, however, as in racing, for instance, it is desirable for the rider to bend forward, it is desirable to have the handles properly adjusted for this purpuse. Moreover in persons of different heights riding the same machine, it is desirable to be able to adjust it to accommodate the length of the arms of the rider, and in all of these adjustments, it is exceedingly desirable that the handle bar shall be held permanently and fixed and it is with a view of providing simple and effective means for accomplishing all these results that my invention is made, and I will now proceed to describe the embodiment thereof shown in the drawings.

The head A, may be of any desirable construction and is shown as consisting of a tube to which the bars B, B, of the frame are secured. Extending through the head is a tube C, which is connected to the forward fork or yoke and which is movable in the tube A. Mounted in this tube is the stem D, to which the handle bar E, is secured in the manner hereinafter indicated. The said handle bar E, it will be observed is bent or curved in different planes, that is to say, in addition to being bent or curved in a horizontal plane to bring the hand pieces in convenient reach of the rider, it is also bent or curved in a vertical plane which, whenever the handle bar is turned or brought to the different positions hereinafter indicated, will give to the hand pieces of the bar, either an upward or downward curve accordingly as may be desired in the use of the machine. The stem is connected with the tube C, in any suitable way so that it can be adjusted and turned therein and I have shown a clamp C', by means of which the stem D, may be clamped to the tube C, although any other well known or desirable construction may be used.

The stem D, is made practically T-form having an opening D', transversely through it, and in this opening is fitted the handle bar E. This handle bar is bent or curved in different planes and is provided with suitable handles E', of any suitable construction. The stem is provided with some suitable means, whereby the handle bar may be clamped or secured in position in the T-portion thereof, and in Figs. 1 and 2, I have shown the upper portion of the stem as being slotted, as at $d$, forming two jaws $D^2$, $D^3$, which may be secured or brought together by any suitable means as a nut or bolt D⁴.

In Fig. 3, I have shown another means in which the T-portion of the stem is a complete ring, through which the handle bar E, is inserted and one edge of the stem is provided with a series of teeth $a$. The handle bar is preferably enlarged at its central portion F, to fit the opening in the stem and it is provided with a flange or collar F', one edge of which is also provided with a series of teeth $b$, corresponding to the teeth $a$, on the stem. The other end of the enlargement is provided with a screw threaded portion $f$, with which engages a nut or sleeve F². While this portion F, is shown as enlarged in the present instance, it may be, however, of practically the same size as the remaining portion of the handle bar, as the same result may be accomplished in substantially the same way. With this construction it will be seen that when the teeth of the collar or projection F, are brought in contact with the teeth on the side of the stem, they interlock and may be secured and held in this interlocked position by tightening the nut or sleeve F², and when it is desirable to change the position of the handle bar it is simply necessary to loosen the nut sufficiently to allow the disengagement of the nut or interlocking devices and adjust the handle and again secure it in position by tightening the nut. With this arrangement it will be seen that the handle may be adjusted to any of the positions shown in Fig. 1, and designated as 1, 2 and 3, and securely held in position. It will be observed in the position 3, the handle bar is reversed, it being curved upward instead of downward and to accomplish this it only necessary to loosen the clamp C', and turn the stem in its socket in the tube C, a half revolution and turn the handle bar as indicated in the dotted line 3.

It will be thus observed that not only can the handle bar be adjusted in any desired height to accommodate the wishes of the rider, but that it can be reversed as well and held in any of the positions securely and permanently against accidental displacement. Moreover the means of attaching are simple cheap and effective, requiring simply the loosening of a screw in one instance, or the loosening of a nut in the other, and in all cases the bar is centrally mounted with relation to the stem so as to be in the best position for turning the steering post or yoke.

What I claim is—

1. In a bicycle, the combination with a head or support, of a stem rotatively mounted in the support, means for securing the stem and support together, a handle bar bent or curved in different planes and rotatively mounted on the stem, and means for securing the bar and stem together after adjustment, substantially as described.

2. In a bicycle, the combination with the head or support having a movable stem therein, adapted to be turned completely around and provided with a T-clamp, of a tube surrounding said stem within the head or support and provided with means for clamping the stem in position, and a handle bar bent or curved in different planes and passing through the T-clamp and adapted to be rotated therein, and secured after adjustment, substantially as shown and for the purpose described.

3. In a bicycle, a head or support, a stem rotatable in said head or support, means for securing the stem within the head or support, a handle bar bent or curved in different planes and rotatably mounted on the stem, and means for securing said bar in different positions, substantially as described.

4. In a bicycle, the steering head or support, a stem rotating in said stem or support and terminating at the top in a bearing which forms a part thereof, the handle-bar bent or curved in different planes and rocking in said bearing, the detent devices for locking the handle-bar in different positions of adjustment in the bearing, and flanged sleeves or collars on the handle-bar embracing the bearing, substantially as set forth.

In testimony whereof I have signed my name to this specification in the presence of two subscribing witnesses.

ARTHUR F. HOOD.

Witnesses:
 FRED J. GALLOWAY,
 ROBT. K. KING.